A. WEAVER.
Slides for Extension-Tables.

No. 165,459. Patented July 13, 1875.

Witnesses:
A. Jones.
T. Martin.

Inventor:
Anthony Weaver
by J. J. Greenough Atty

UNITED STATES PATENT OFFICE.

ANTHONY WEAVER, OF SYRACUSE, NEW YORK.

IMPROVEMENT IN SLIDES FOR EXTENSION-TABLES.

Specification forming part of Letters Patent No. 165,459, dated July 13, 1875; application filed January 12, 1874.

*To all whom it may concern:*

Be it known that I, ANTHONY WEAVER, of Syracuse, New York, have invented an Improvement in Slides for Extension-Tables, of which the following is a specification:

My invention consists of recessed metallic slides, each formed of flanged side pieces, connected by a web, in combination with wooden slide-bars grooved to receive the metallic slides, and having stop-pins, which are received by the recesses in the metallic slides.

Figure 1:
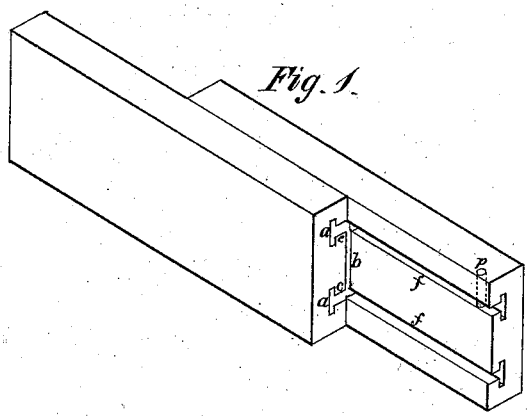
Figure 2:
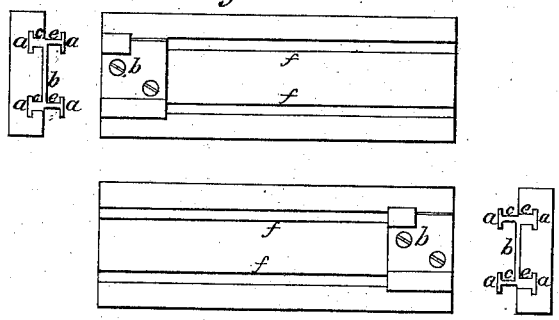

Referring to the accompanying drawing, Figure 1 is a general view of two slides united. Fig. 2 shows the parts separate.

The metal slide-pieces are made as follows: The form of the cross-section is similar to the letter H, the two uprights being short in proportion to the space between them. The ends of each of these uprights $c\ e$ are furnished with a broad flange, $a$, as clearly seen in the drawing, and the center web is made quite stout to connect them firmly. It is about an inch and a half broad, more or less, between the parts $c\ e$, and the length should be about two inches or more. One of the parts, $c$, runs the whole length on both sides of the web; the other, $e$, is made shorter on one side, as shown in Fig. 2. The wooden slide-pieces are grooved out along the lines $f\ f$ for the parts of the metal slides $c\ e$ to fit and slide in. The surface of the wooden slide between the grooves $f\ f$, it will be observed, is sunk below the outsides of the slides, so as to allow a free space for the web $b$ of the metal slide to freely slide in. This space is very important, and greatly reduces the friction, serving to keep the slides free by receiving any dirt, slivers or other loose matter to clear away from the slides. At a point, $p$, a pin is inserted into the edge of the wooden slide, and projects down through the groove $f$, forming a stop for the metal slide to strike against and stop it, preventing the slides from slipping by when closed onto each other. When drawn out the two metal slides come in contact, as desired. In putting the parts together the metal slides are slid into the grooves $f\ f$, and affixed to the slides by screws or pin, through the edge or otherwise.

Having thus fully described my improvement in table-slides, what I claim is—

The H-formed metallic slides, each consisting of the flanged side pieces $a\ c\ e$, notched or recessed on one side to accommodate the holding-pins $p$, and connected by a web, $b$, in combination with the wooden rails grooved to receive the side pieces $a\ c\ e$, and recessed to accommodate the web $b$, while permitting the faces of the said wooden rails to work in close contact at the edges.

ANTHONY WEAVER.

Witnesses:
   J. J. GREENOUGH,
   GEO. W. WILSON.